United States Patent
Sherpa

(10) Patent No.: US 12,363,373 B1
(45) Date of Patent: Jul. 15, 2025

(54) SYSTEMS AND METHODS FOR SETTING VIEWING DIRECTIONS FOR VIDEOS

(71) Applicant: GoPro, Inc., San Mateo, CA (US)

(72) Inventor: David Sherpa, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/431,612

(22) Filed: Feb. 2, 2024

(51) Int. Cl.
 *H04N 21/431* (2011.01)
 *H04N 21/472* (2011.01)

(52) U.S. Cl.
 CPC ... *H04N 21/4312* (2013.01); *H04N 21/47217* (2013.01)

(58) Field of Classification Search
 None
 See application file for complete search history.

(56) References Cited

U.S. PATENT DOCUMENTS

| | | | | |
|---|---|---|---|---|
| 10,587,855 B1 * | 3/2020 | Chinnaiyan | ............ | G06V 20/49 |
| 10,643,303 B1 * | 5/2020 | Cotoros | ................ | H04N 23/90 |
| 10,687,039 B1 * | 6/2020 | Vaden | ................ | H04N 13/117 |
| 10,742,882 B1 * | 8/2020 | Oulès | ................ | H04N 23/698 |
| 10,970,602 B1 * | 4/2021 | Cunningham | ...... | G06F 18/2431 |
| 12,155,809 B2 * | 11/2024 | Han | ...................... | H04N 13/111 |
| 12,184,968 B2 * | 12/2024 | Tran | ...................... | H04N 23/695 |
| 2015/0082364 A1 * | 3/2015 | Jayaram | ........... | H04N 21/23614 725/109 |
| 2017/0084086 A1 * | 3/2017 | Pio | ............................ | G06T 7/60 |
| 2017/0142480 A1 * | 5/2017 | Gupta | ................. | H04N 13/167 |
| 2018/0157915 A1 * | 6/2018 | Sherry | .................... | H04N 21/84 |
| 2022/0141548 A1 * | 5/2022 | Niamut | ................ | H04N 21/235 725/116 |
| 2023/0171486 A1 * | 6/2023 | Tran | ........................ | H04R 3/005 386/280 |

\* cited by examiner

*Primary Examiner* — James R Marandi
(74) *Attorney, Agent, or Firm* — Esplin & Associates, PC

(57) ABSTRACT

A graphical user interface may provide a views of a video. The graphical user interface may include a manual target element positioned over a spatial portion of the video. A user may interact with the spatial portion of the video within the manual target element to start recording viewing directions for the video. A user may interact with other spatial portions of the video to change the spatial parts of the video presented within the graphical user interface. A user may interact with the graphical user interface to utilize object tracking to record viewing directions for the video.

20 Claims, 9 Drawing Sheets

SYSTEMS AND METHODS FOR SETTING VIEWING DIRECTIONS FOR VIDEOS

FIELD

This disclosure relates to setting viewing directions for videos based on user interaction with a graphical user interface.

BACKGROUND

A video may have a wide field of view (e.g., spherical field of view, panoramic field of view). The wide field of view of the video may make it difficult to see different spatial parts of the video at the same time. A user may wish to extract particular spatial extents of the video for presentation and/or to create a two-dimensional video. Specifying which spatial extents of the video will be included in a presentation and/or to create a two-dimensional video may be difficult and time consuming.

SUMMARY

This disclosure relates to setting viewing directions of videos. Video information and/or other information may be obtained. The video information may define a video. The video may have a progress length. The video may include visual content viewable as a function of progress through the progress length. The visual content may have a field of view. Presentation of a graphical user interface on the electronic display may be effectuated. The graphical user interface may include a view of the visual content. The graphical user interface may include a manual target element. The manual target element may be positioned over a spatial portion of the visual content. The manual target element may enable setting of a viewing direction for the visual content based on interaction of a user with the spatial portion of the visual content within the manual target element.

A system for setting viewing directions of videos may include one or more electronic storages, one or more electronic displays, one or more processors, and/or other components. An electronic storage may store video information, information relating to a video, information relating to visual content, information relating to viewing directions, information relating to a graphical user interface, and/or other information. An electronic display may be configured to present one or more graphical user interfaces.

The processor(s) may be configured by machine-readable instructions.

Executing the machine-readable instructions may cause the processor(s) to facilitate setting viewing directions of videos. The machine-readable instructions may include one or more computer program components. The computer program components may include one or more of a video information component, a graphical user interface component, and/or other computer program components.

The video information component may be configured to obtain video information and/or other information. The video information may define a video. The video may have a progress length. The video may include visual content viewable as a function of progress through the progress length of the video. The visual content may have a field of view.

The graphical user interface component may be configured to effectuate presentation of one or more graphical user interfaces on the electronic display. The graphical user interface(s) may include a view of the visual content. The graphical user interface may include a manual target element. The manual target element may be positioned over a spatial portion of the visual content. The manual target element may enable setting of a viewing direction for the visual content based on interaction of the user with the spatial portion of the visual content within the manual target element.

In some implementations, the interaction of the user with the spatial portion of the visual content within the manual target element may include interaction of the user with the manual target element.

In some implementations, the view of the visual content may include a punchout of the visual content within a viewing window. The viewing window may be positioned within the field of view of the visual content. The position of the viewing window within the field of view of the visual content may be changed based on interaction of the user with other spatial portions of the visual content outside the manual target element.

In some implementations, the viewing direction for the visual content may be set to be pointed at the spatial portion of the visual content with which the user interacts.

In some implementations, the interaction of the user with the spatial portion of the visual content within the manual target element may cause playback of the visual content.

In some implementations, the interaction of the user with the spatial portion of the visual content within the manual target element may initiate the setting of the viewing direction for the visual content as the function of progress through the progress length of the video. The viewing direction set for the visual content as the function of progress through the progress length of the video may change based on changes in the spatial portion of the visual content with which the user interacts.

In some implementations, the setting of the viewing direction for the visual content as the function of progress through the progress length of the video may be stopped based on end of the interaction of the user with the spatial portion of the visual content. The viewing direction may be set for a temporal part of the progress length of the video. The viewing direction set for the temporal part of the progress length of the video may form a viewing direction segment. In some implementations, the graphical user interface may further include a delete element. The delete element may enable deletion of the viewing direction segment based on interaction of the user with the delete element.

In some implementations, the graphical user interface may further include an automatic mode element. The automatic mode element may enable setting of the viewing direction for the visual content based on object tracking and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
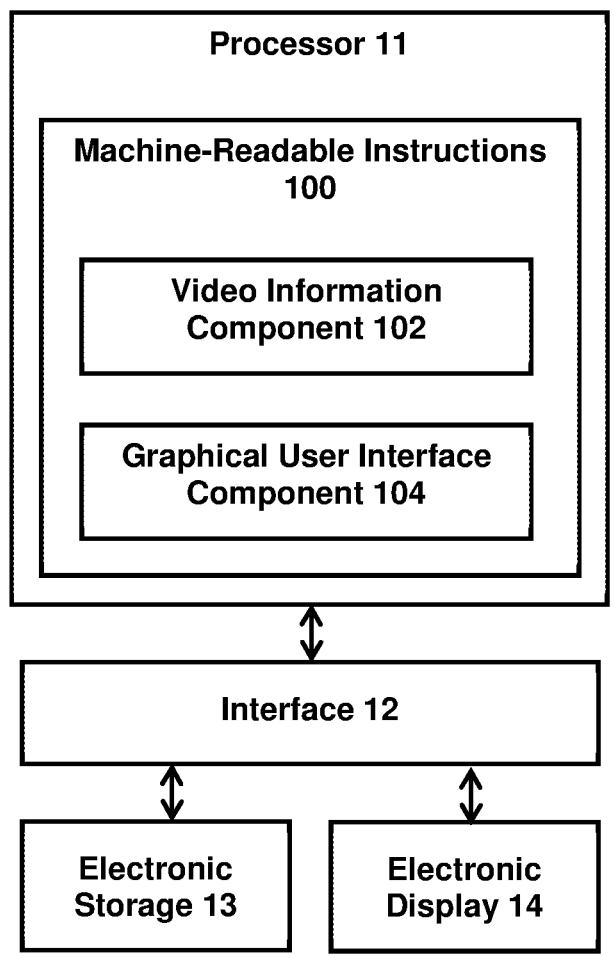
FIG. 1 illustrates an example system for setting viewing directions of videos.

FIG. 1 illustrates a system 10 for setting viewing directions of videos. The system 10 may include one or more of a processor 11, an interface 12 (e.g., bus, wireless interface), an electronic storage 13, an electronic display 14, and/or other components. Video information and/or other information may be obtained by the processor 11. The video information may define a video. The video may have a progress length. The video may include visual content viewable as a function of progress through the progress length. The visual content may have a field of view. Presentation of a graphical user interface on the electronic display may be effectuated by the processor 11. The graphical user interface may include a view of the visual content. The graphical user interface may include a manual target element. The manual target element may be positioned over a spatial portion of the visual content. The manual target element may enable setting of a viewing direction for the visual content based on interaction of a user with the spatial portion of the visual content within the manual target element.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to viewing directions, information relating to a graphical user interface, and/or other information.

The electronic display 14 may refer to an electronic device that provides visual presentation of information. The electronic display 14 may include a color display and/or a non-color display. The electronic display 14 may be configured to visually present information. The electronic display 14 may be configured to present one or more graphical user interfaces. The electronic display 14 may present information using/within one or more graphical user interfaces. For example, the electronic display 14 may present video information, information relating to a video, information relating to visual content, information relating to viewing directions, information relating to a graphical user interface, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may be captured by the image capture device 300. A video with a wide field of view may depict a large portion of a scene. The wide field of view of the video may make it difficult for a user to see every spatial extent of the scene depicted within the video at once. A user may wish to extract particular spatial extents of the video for presentation and/or to create a two-dimensional video. Specifying which spatial extents of the video will be included in a presentation and/or to create a two-dimensional video may be difficult and time consuming.

The present disclosure enables a user to set viewing directions for a video by interacting with a graphical user interface. The graphical user interface enables the user to record the viewing direction in which the video is to be framed for presentation. The graphical user interface enables the user to easily switch between different viewing directions (e.g., switch between different subjects depicted in the video) and enables faster and more intuitive creation of movements than compared to existing solutions. The graphical user interface enables the user to record the viewing directions for the video by interacting with (e.g., pressing) parts of the electronic display while the video is being played. The directions of the video corresponding to the parts of the electronic display interacted upon by the user may be assigned as the viewing directions for the video. The video may be played when the user interacts with the electronic display (e.g., keeps pressing the electronic display with a finger), and the video may be paused when the user stops interacting with the electronic display (lifts the finger from the electronic display). The graphical user interface enables the user to record the viewing directions for the video by selecting an object for tracking. The directions of the video corresponding to the tracked object may be assigned as the viewing directions for the video. The video may be played during the usage of the object tracking, and the video may be paused when the object tracking is stopped.

The recorded viewing directions (e.g., viewing directions manually recorded based on user interaction with the electronic display, viewing directions automatically recorded based on object tracking) may be treated the same in the timeline of viewing directions. Viewing directions recorded for a duration of the video may form a viewing direction segment. The graphical user interface enables the user to delete a viewing direction segment. At the end of one instance of viewing direction recording, the graphical user interface may enable the user to "rewind" back and unto the recording. The graphical user interface enables the user to go back or forward in time in the video and record over existing viewing directions (record over entirety or part of an existing viewing direction segment).

Referring back to FIG. 1, the processor 11 (or one or more components of the processor 11) may be configured to obtain information to facilitate setting viewing directions of videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate setting viewing directions of videos. The machine-readable instructions 100 may include one or more computer program components. The machine-readable instructions 100 may include one or more of a video information component 102, a graphical user interface component 104, and/or other computer program components.

The video information component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The video may include visual content viewable as a function of progress through the progress length of the video. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The visual content may have a field of view. A field of view of a video/visual content may refer to a field of view of a scene captured within the video/visual content (e.g., within video frames). A field of view of a video/visual content may refer to the extent of a scene that is captured within the video/visual content. In some implementations, the field of view of a video/visual content may be greater than or equal to 180-degrees. In some implementations, the field of view of a video/visual content may be smaller than or equal to 180-degrees.

In some implementations, a video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. In some implementations, a wide field of view video may include a panoramic video having a panoramic field of view. Panoramic field of view may be less than 360-degrees of capture. Other fields of view of videos are contemplated. A wide field of view video may include and/or may be associated with spatial audio.

Content of one or more videos may be referred to as video content. Video content may include visual content, audio content, and/or other content. For example, video content may include visual content viewable as a function of progress through the progress length of the video, audio content playable as a function of progress through the progress length of the video, and/or other content that may be played back as a function of progress through the progress length of the video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The graphical user interface component 104 may be configured to effectuate presentation of one or more graphical user interfaces on one or more electronic displays (e.g., the electronic display 14). Effectuating presentation of a graphical user interface on an electronic display may include causing, bringing about, facilitating, and/or otherwise effectuating presentation of the graphical user interface on the electronic display.

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

A graphical user interface(s) may include one or more views of the visual content. A view of the visual content may include presentation of one or more spatial extents of the visual content. A view of the visual content may include presentation of one or more punchouts of the visual content. One or more punchouts of the visual content may be included within a graphical user interface to provide views of one or more different spatial extents of the visual content.

A punchout of visual content may include output of a virtual camera. A virtual camera may define one or more spatial extents of the visual content to be output (e.g., for current presentation, for inclusion in a video clip for later presentation) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

A punchout of the visual content may be presented based on a viewing window and/or other information. A viewing window may define the extents of the visual content to be included within a presentation of the video and/or included within a video clip. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content. The visual content of the video within the viewing window may be presented on one or more electronic displays. The visual content of the video within the viewing window may be used to generate a video clip (e.g., 2D video, video summary, video edit). The video clip may be stored in the electronic storage 13.

A punchout of the visual content based on a viewing window may include extent of the visual content within the viewing window. The viewing window may be positioned at different locations within the visual content to provide different views of the visual content. The position of the viewing window within the field of view of the visual content may determine the framing of the visual content for presentation.

Positioning of a viewing window within the field of view of the visual content may refer to placement of the viewing window within the field of view of the visual content.

The positioning/placement of the viewing window may be defined by one or more of viewing direction, viewing size, viewing rotation, and/or other information. The arrangement of the pixels within the viewing window may be defined by viewing projection and/or other information. A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

FIGS. 3A, 3B, 3C, 3D, and 3E illustrate an example graphical user interface 300. The views of the graphical user interface 300 in FIGS. 3A, 3B, 3C, 3D, and 3E are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, 3C, 3D, and/or 3E. Other graphical user interfaces are contemplated.

Figure 3A:
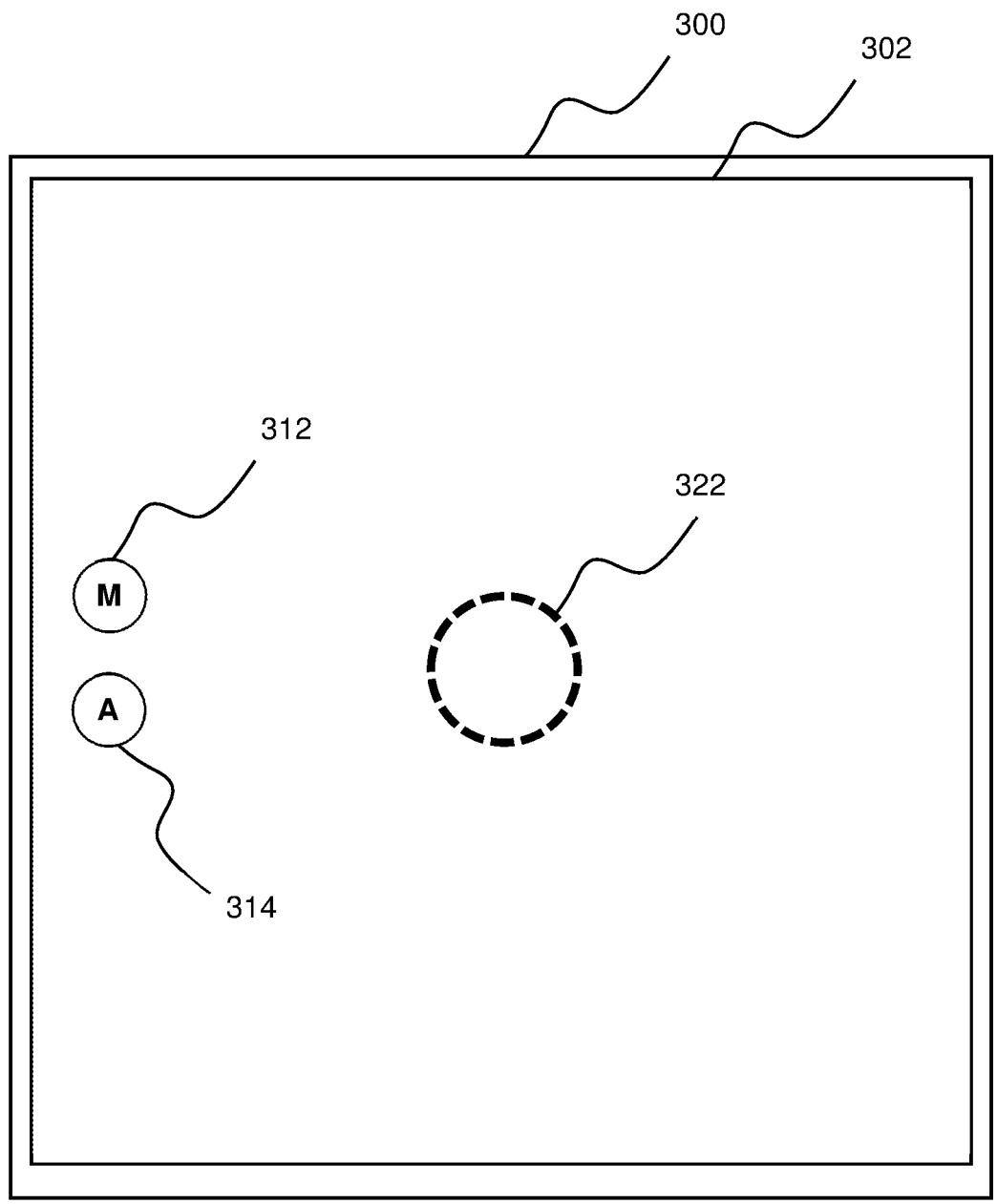
FIG. 3A illustrates an example graphical user interface.

Referring to FIG. 3A, the graphical user interface may include a view section 302. The view section 302 may refer to a space within the graphical user interface 3000 that includes a view of visual content. The view section 302 may display the video. The view section 302 may provide visual playback of the video. The view section 302 may include presentation of visual content of a video. The view section 302 may include presentation of a punchout of the visual content of the video. The view section 302 may include presentation of a punchout of the visual content of the video within a viewing window, with the viewing window positioned within the field of view of the visual content.

The graphical user interface 300 may include a manual mode element 312, an automatic mode element 314, and/or other interface elements. The manual mode element 312 may refer to an interface element that enables the user to manually set viewing directions for the visual content of the video. The manual mode element 312 may enable the user to provide input to the system 10 to operate in a manual viewing direction mode. In the manual viewing direction mode, the viewing directions for the visual content of the video may be set based on user interaction with one or more spatial portions of the visual content presented within the display section 302. The manual mode element 312 may be interacted upon by the user to input command to show a manual target element.

The automatic mode element 314 may refer to an interface element that enables the user to automatically set viewing directions for the visual content of the video. The automatic mode element 314 may enable the user to provide input to the system 10 to operate in an automatic viewing direction mode. In the automatic viewing direction mode, the viewing directions for the visual content of the video may be set based on tracking of an object depicted within the visual content of the video. The automatic mode element 314 may be interacted upon by the user to input command to receive information on tracking of an object depicted within the visual content from the user. The automatic mode element 314 may enable setting of the viewing direction for the visual content based on object tracking and/or other information.

In FIG. 3A, the graphical user interface 300 may include a manual target element 322. The graphical user interface 300 may include the manual target element 322 based on the operation of the system 10 in the manual viewing direction mode. The graphical user interface 300 may include the manual target element 322 based on user interaction with the manual mode element 312. While the manual target element 322 is shown to be circular in FIG. 3A, this is merely as an example and is not meant to be limiting. Use of other shapes is contemplated.

The manual target element 322 may be positioned over a spatial portion of the visual content. For example, in FIG. 3A, the manual target element 322 may be positioned over a spatial portion of the visual content that is displayed at the center of the display section 302. Other positioning of the manual target element 322 within the graphical user interface 300 is contemplated.

The manual target element 322 may enable setting of a viewing direction for the visual content for future presentation of the visual content. The manual target element 322 may enable setting of a viewing direction for the visual content for presentation on the electronic display 14 and/or for inclusion in a video clip. The manual target element 322 may enable setting of a viewing direction for the visual content based on interaction of the user with the spatial portion of the visual content within the manual target element 322. The manual target element 322 may enable setting of a viewing direction for the visual content based on interaction of the user with the spatial portion of the visual content shown within the manual target element 322. For example, a user may press with a finger and/or click with a mouse a part (e.g., one or more pixels) of the visual content that is shown within the manual target element 322 to set a viewing direction for the visual content. Setting of a viewing direction for the visual content may include ascertaining, calculating, computing, determining, establishing, finding, and/or otherwise setting the viewing direction for the visual content. The viewing direction for the visual content may be set to be pointed at the spatial portion of the visual content with which the user interacts. The viewing direction for the visual content may be set to be pointed in the direction of the visual content corresponding to the spatial portion of the visual content interacted upon by the user.

In some implementations, the interaction of the user with a spatial portion of the visual content within the manual target element 322 may include interaction of the user with the manual target element 322. For example, while the manual target element 322 is shown in FIG. 3A as having an open center, the manual target element 322 may have a closed center, and the user may interact with the spatial portion of the visual content within (behind) the manual target element 322 by interacting with the manual target element 322. Other shapes, opacity, and/or configuration of the manual target element 322 are contemplated.

The interaction of the user with a spatial portion of the visual content within the manual target element 322 may cause playback of the visual content. For example, when the user enters the manual viewing direction mode (based on user interaction with the manual mode element 312), the playback of the visual content may be paused. The graphical user interface 300 may include one or more interface elements (e.g., scrubber, buttons to move forward/backward by a certain time duration) that enables the user to move forward or backward through the progress length of the video. When the user has found a moment from which the viewing direction is to be set, the user may interact with a spatial portion of the visual content within the manual target element 322. When the user interacts with a spatial portion of the visual content within the manual target element 322, the playback of the visual content may be started. The interaction of the user with a spatial portion of the visual content within the manual target element 322 may initiate the setting of the viewing direction for the visual content as the function of progress through the progress length of the video. The interaction of the user with a spatial portion of the visual content within the manual target element 322 may enable the user to record the viewing direction for the video as the video is played within the display section 302.

The viewing direction set for the visual content as the function of progress through the progress length of the video may change based on changes in the spatial portion of the visual content with which the user interacts. The user may interact with different spatial portions of the visual content within the display section 302 to set different viewing directions for the visual content at different moments within the progress length of the video. The user may continuously interact with spatial portion(s) of the visual content within the display section 302 to set/record viewing directions for the visual content as the video is played. For example, the user may continuously hold a finger on the electronic display or continuously hold a mouse button down. Once the setting/recording of the viewing direction has been initiated by the user via interaction with a spatial portion of the visual content within the manual target element 322, the user may be free to interact with other spatial portions of the visual content within the display section 302. For example, the user may press a finger within the manual target element 322 to start recording the viewing directions for the visual content of the video. Once the viewing direction recording has started, the user may move the finger (while holding the finger pressed on the electronic display) to other spatial portions of the visual content presented within the display section to change the viewing direction that is recorded for the visual content of the video. For example, the user may trace a path along different spatial portions of the visual content during video playback to cause the viewing direction to follow along the traced path. The user may move the finger to hold it over an object during video playback to cause the viewing direction to follow the object.

The setting of the viewing direction for the visual content as the function of progress through the progress length of the video may be stopped based on end of the interaction of the user with the spatial portion(s) of the visual content. When the user stops interaction with the spatial portion(s) of the visual content, such as by lifting the finger off the electronic display or stops holding the mouse button down, the recording of the viewing direction for the visual content may be stopped. When the setting/recording of the viewing direction for the visual content has stopped, the playback of the visual content may be stopped (paused). When the user stops interaction with the spatial portion(s) of the visual content, both the setting/recording of the viewing direction and the playback of the visual content may be stopped. To restart setting/recording of the viewing direction for the visual content, the user may be required to interact with a spatial portion of the visual content within the manual target element 322.

The view of the visual content presented within the view section 302 may be changed. The view of the visual content presented within the view section 302 may be changed based on change in the viewing window for the visual content. The position of the viewing window within the field of view of the visual content may be changed to change the spatial extents of the visual content included/presented within the view section 302. Change in the position of the viewing window within the field of view of the visual content may include change in viewing direction, viewing size, viewing rotation, and/or viewing projection for the viewing window.

The position of the viewing window within the field of view of the visual content may be changed based on interaction of the user with spatial portions of the visual content outside the manual target element 322. The user may interact with portions of the visual content outside the manual target element 322 to change the spatial extents of the visual content presented within the view section 302. For example, the user may make (with a mouse, with a finger) a panning motion on the spatial portions of the visual content outside the manual target element 322 to pan the viewing window within the field of view of the visual content. The user may make a stretching gesture or a squeezing gesture on the spatial portions of the visual content outside the manual target element 322 to change the zoom level for the viewing window (e.g., zoom in and out of the visual content). The user may make a rotating gesture (e.g., hold one finger in place while moving another finger in rotation around the held finger) on the spatial portions of the visual content outside the manual target element 322 to rotate the viewing window. The user may interact with the area of the graphical user interface 300/electronic display within the manual target element 322 to set viewing directions for the visual content and may interact with the area of the graphical user interface 300/electronic display outside the manual target element 322 to change the spatial extents of the visual content that is presented.

Figure 3B:
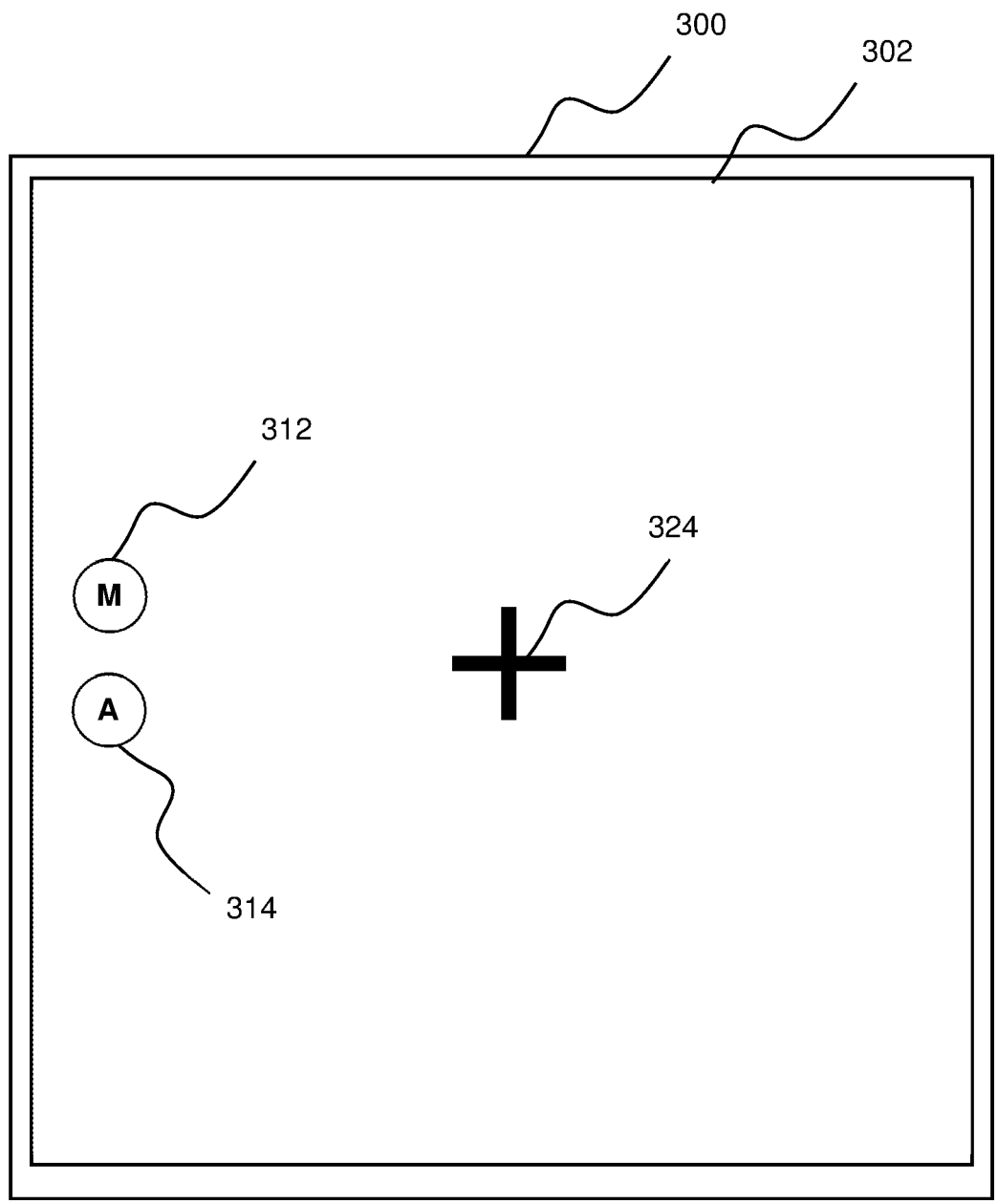
FIG. 3B illustrates an example graphical user interface.

Responsive to user interaction with the spatial portion of the visual content within the manual target element 322 to set the viewing direction for the visual content, the graphical user interface 300 may be changed. For example, responsive to user interaction with the spatial portion of the visual content within the manual target element 322 to set the viewing direction for the visual content, the graphical user interface 300 may be changed as shown in FIG. 3B. As shown in FIG. 3B, the manual target element 322 may disappear from the graphical user interface 300 and a target element 324 may appear within the graphical user interface 300. While the target element 324 is shown as a cross in FIG. 3B, this is merely as an example and is not meant to be limiting. Use of other shapes is contemplated. The manual target element 322 may reappear responsive to end of the interaction of the user with the spatial portion(s) of the visual content.

The target element 324 may visually represent the viewing direction that is set for the visual content. The target element 324 may be positioned over the spatial portion of the visual at which the viewing direction is pointed. The target element 324 may visually represent the viewing direction that is being recorded as the visual content is being played. As the user interacts with different spatial portions of the visual content, the target element 324 may change its position to indicate the latest viewing direction that has been recorded.

Figure 3C:
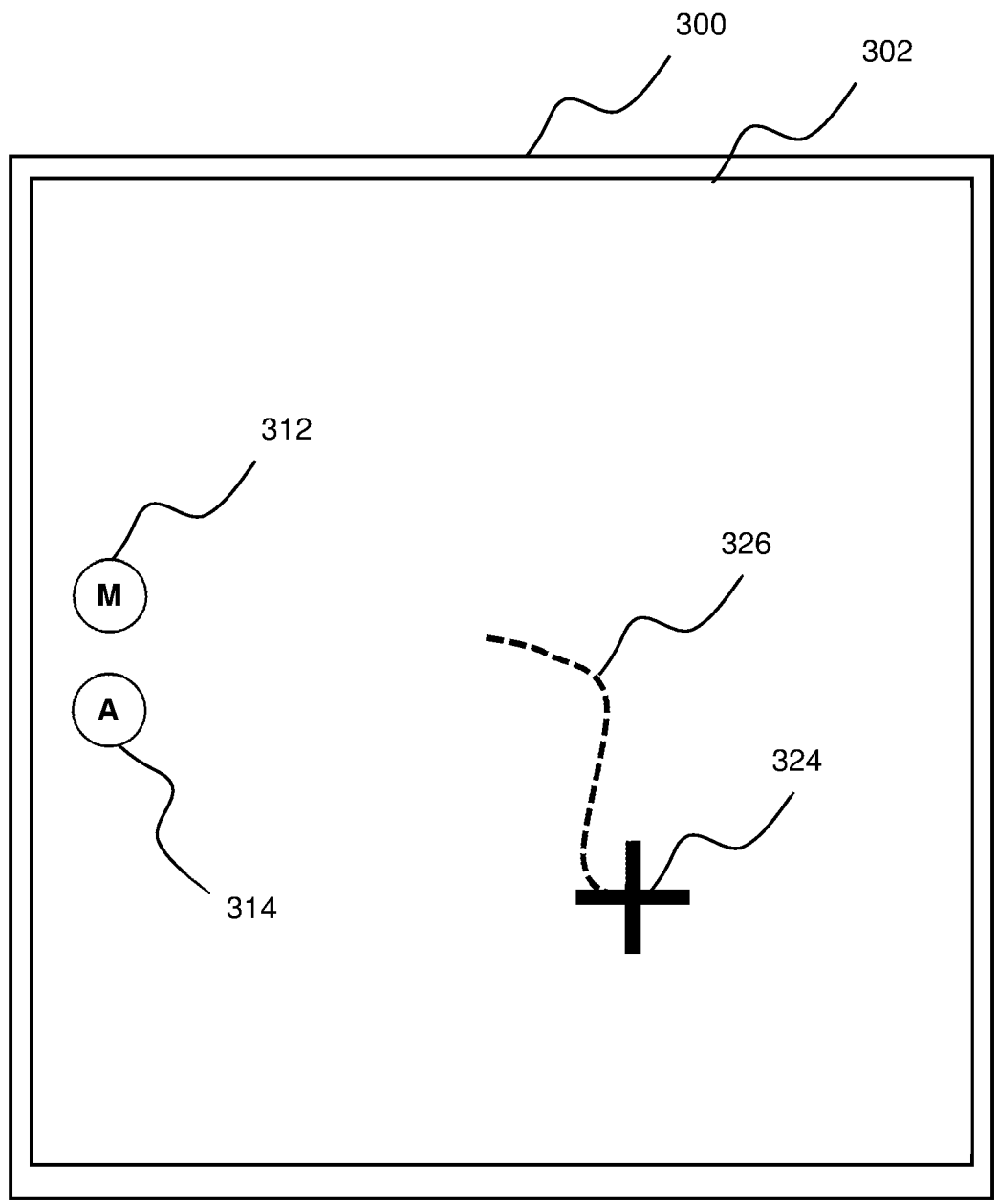
FIG. 3C illustrates an example graphical user interface.
Figure 3D:
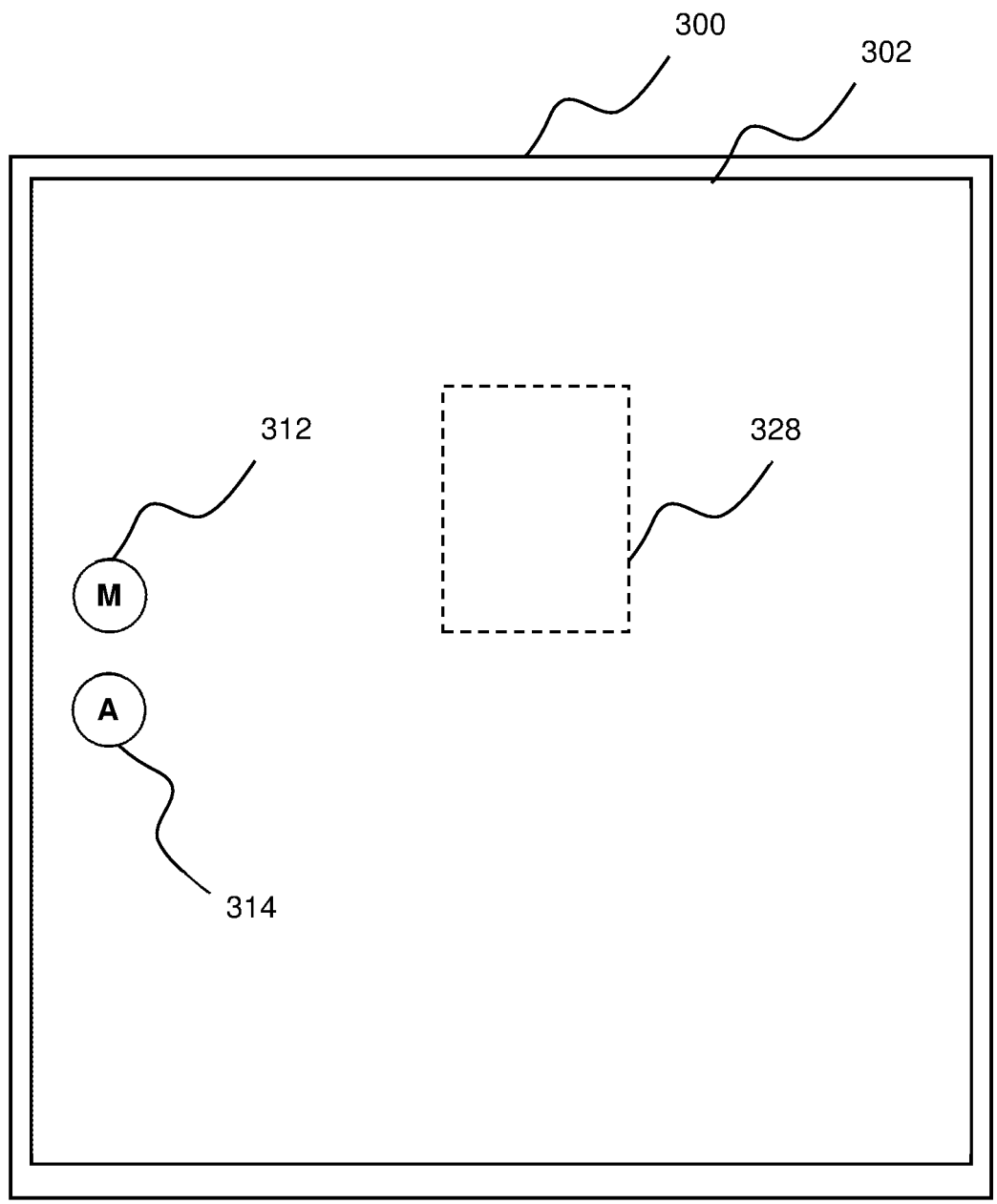
FIG. 3D illustrates an example graphical user interface.

For example, referring to FIG. 3C, after the user interacted with the spatial portion of the visual content within the manual target element 322, the user may have traced a path 326 along the visual content/the display section 302/the electronic display. Different viewing directions may be set/recorded as the user traced the path 326 during playback of the visual content. The target element 324 may be positioned over the spatial portion corresponding to the latest viewing direction set/recorded by the user.

Responsive to user interaction with the automatic mode element 314, the graphical user interface 300 may be changed. For example, responsive to user interaction with the automatic mode element 314, the graphical user interface 300 may be changed as shown in FIG. 3C. As shown in FIG. 3C, the manual target element 322 may disappear from the graphical user interface 300. The manual target element 322 may reappear responsive to user interaction with the manual mode element 312.

The graphical user interface 300 may include one or more interface elements that facilitate user selection of an object depicted within the visual content for tracking. The graphical user interface 300 may enable a user to information on tracking of an object depicted within the visual content. For example, a graphical user interface 300 may enable a user to draw a shape (e.g., a box, a circle, an outline) around the object to be tracked. For example, referring to FIG. 3D, a user may have drawn a box 328 around an object to be tracked. The object may be detected within the shape drawn by the user. The position of the detected object may be tracked to set the viewing direction for the visual content. After the object is detected, the playback of the visual content may be started and the viewing direction for different moments within the progress length may be set based on the position of the object that is tracked. For instance, the viewing direction may be set to be pointed at the center of the object. As the object moves through the video, the viewing direction may be changed to follow the object.

Figure 3E:
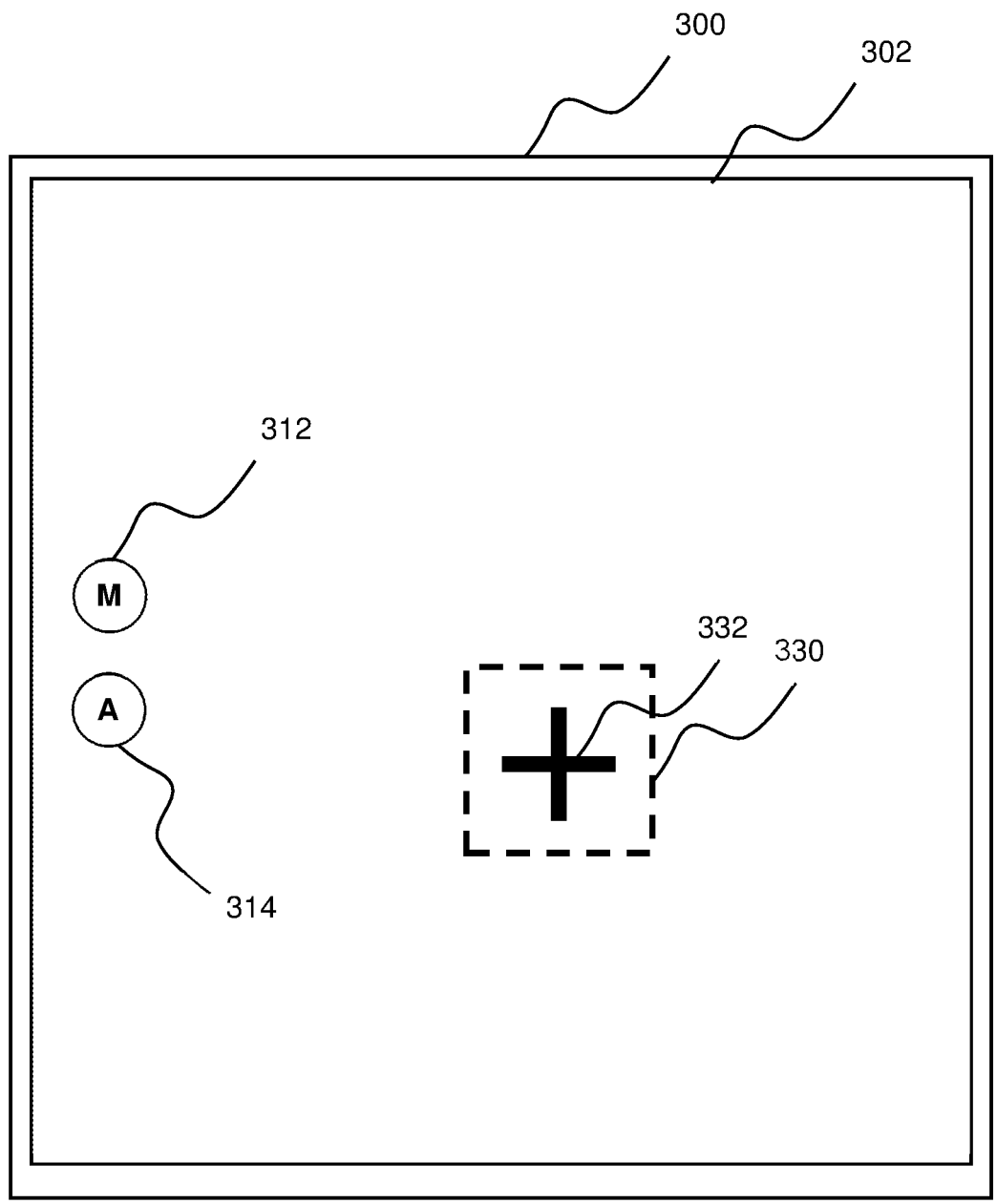
FIG. 3E illustrates an example graphical user interface.

Referring to FIG. 3E, the graphical user interface 300 may include a target element 332. The target element 332 may visually represent the viewing direction that is set for the visual content. The target element 332 may be positioned over the spatial portion of the visual at which the viewing direction is pointed. The target element 332 may visually represent the viewing direction that is being recorded as the visual content is being played. The position of the target element 332 may be determined based on position of an object detected within the visual content. For instance, the target element 332 may be positioned over the center of an object that is being tracked for viewing direction determination. While the target element 332 is shown as a cross in FIG. 3E, this is merely as an example and is not meant to be limiting. Use of other shapes is contemplated.

The graphical user interface 300 may include a target box element 330. The target box element 330 visually represent the object that is being tracked for viewing direction determination. The target box element 330 may represent the size/shape of the object being tracked, such as the bounding box for the object being tracked. The target box element 330 may have the same shape and/or size as the size and/or shape of the object being tracked changes through the video. The target element 332 may be positioned at the center of the target box element 330. While the target box element 330 is shown as a rectangle/square in FIG. 3D, this is merely as an example and is not meant to be limiting. Use of other shapes is contemplated.

Via interaction with a graphical user interface, the viewing direction for the video may be set for one or more temporal parts of the progress length of the video. The viewing direction set for a temporal part of the progress length of the video may form a viewing direction segment. A viewing direction segment may define the viewing direction as a function of progress through the temporal part of the video. A viewing direction segment may define the viewing direction for different moments within the temporal part of the video.

Figure 4A:
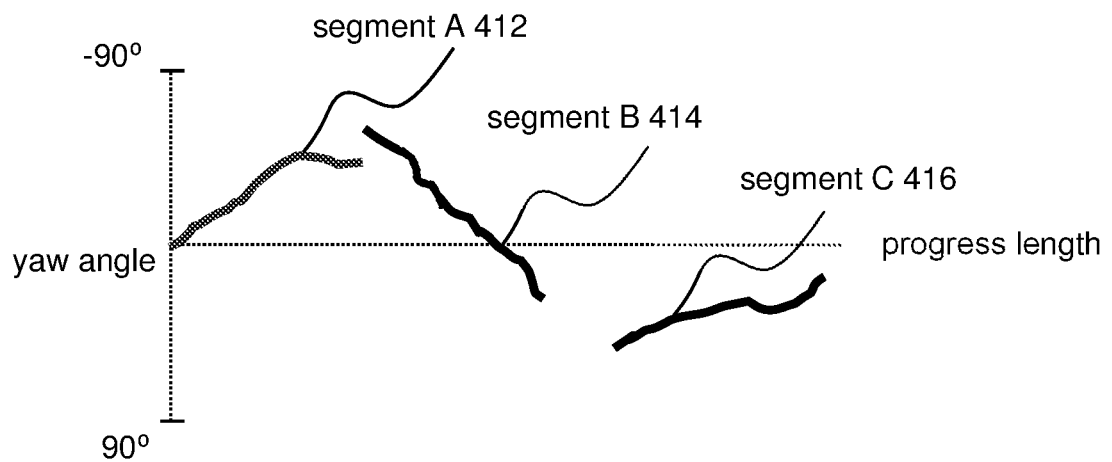
FIG. 4A illustrates example viewing directions for a video.

FIG. 4A illustrates example viewing directions for a video. FIG. 4A shows changes in the yaw angle of the viewing directions for the video. The user may have interacted with the graphical user interface to manually and/or automatically set the viewing directions for different moments within the video. The viewing direction recorded through the graphical user interface may form a segment A 412, a segment B 414, and segment C 416. Other viewing directions and other viewing direction segments are contemplated.

Different viewing direction segments may be continuous or discontinuous. For example, the end of the segment A 412 may not be same as the beginning of the segment B 414. Such jump in the viewing direction may be a result the user using the graphical user interface to cause a jump in the viewing direction between adjacent moments. For example, the user may have manually set the segments A 412 by pressing a finger within the manual target element and moving the finger in the negative yaw angle. At the end of the segment A 412, the use may have lifted the finger off, causing playback of the video to be stopped (paused). The user may have then interacted with the spatial portions of the visual content outside the manual target element to pan the visual content, and then restarted the recording of the viewing direction by pressing a finger within the manual target element, with the recording defining the segment B 414. At the end of the segment B 414, the user may have moved the playback of the video forward in time. The user may have then pressed a finger within the manual target element and started recording the viewing direction for the segment C 416. Similarly, the user may automatically set different viewing direction segments using object tracking.

The viewing directions for different moments in the progress length of the video may be deleted or changed. For example, a part of or an entire viewing direction segment may be deleted via user interaction with one or more user interface elements of the graphical user interface. A user may go to a moment in the video in which the viewing direction has already been set, then record a different viewing direction to replace the existing viewing direction.

Figure 4B:
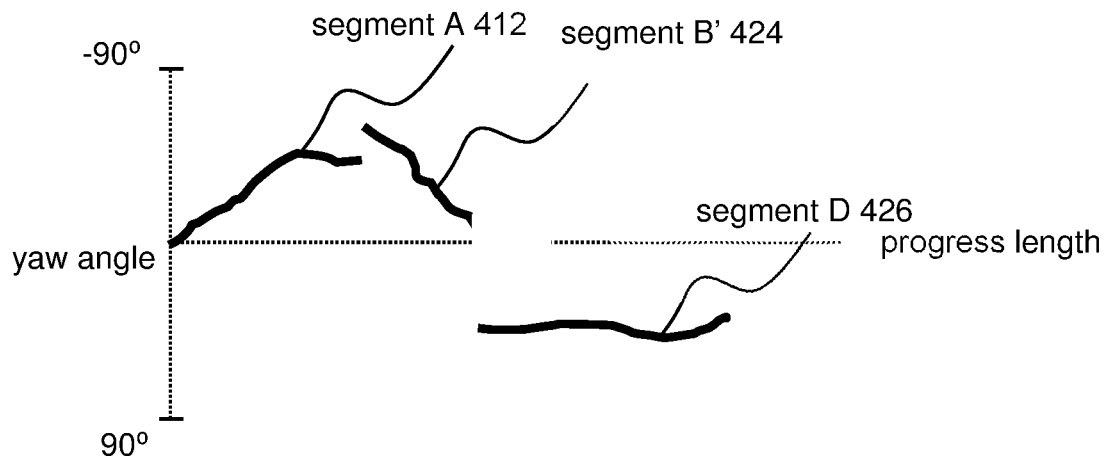
FIG. 4B illustrates example viewing directions for a video.

For example, referring to FIG. 4B, the user may have deleted the segment C 416 and then moved to a moment within the segment B 414. The user may have interacted with the graphical user interface to set viewing direction manually or automatically from the middle of the segment B 414 to modify the segment B 414 into a segment B' 424 and create a new segment D 426.

The viewing direction set for the video by the user may be used to provide presentation of the video on the electronic display 14. The viewing direction set for the video by the user may be used to create a punched-out video (2D video from a spherical video). The viewing direction set for the video by the user may be used to determine the direction in which the viewing window is pointed for presentation. The viewing direction set for the video by the user may be used to determine where the viewing window is located within the field of view of the visual content for presentation. The viewing window may be positioned to be centered on the viewing direction set by the user. The viewing window may be positioned so that the viewing direction set by the user is within the viewing window.

The viewing direction set for the video by the user may be modified for use in presentation of the video. For example, the viewing direction set by the user may be smoothed to remove jitters and/or shakes within the presentation of the video. In some implementations, if a break exist within the viewing direction for the video, the viewing direction that is used for presentation may be generated by interpolating between the break to smoothly connect the viewing direction across the break, In some implementations, a graphical user interface may include a delete element. A delete element may refer to an interface element that enables the user to delete one or more viewing direction segments. A delete element may enable deletion of the viewing direction segment based on interaction of the user with the delete element. A delete element may enable the user to provide input to the system 10 to delete one or more viewing direction segments.

A viewing direction segment that was last recorded may be deleted based on user interaction with the delete element. A viewing direction segment in which the video is currently being played/shown may be deleted based on user interaction with the delete element. Deletion of a viewing direction segment may cause the playback of the video to rewind to the moment in the video corresponding to the start of the deleted viewing direction segment. Deletion of a viewing direction segment may enable a user to "rewind back" the recording of the viewing direction segment.

Figure 5:
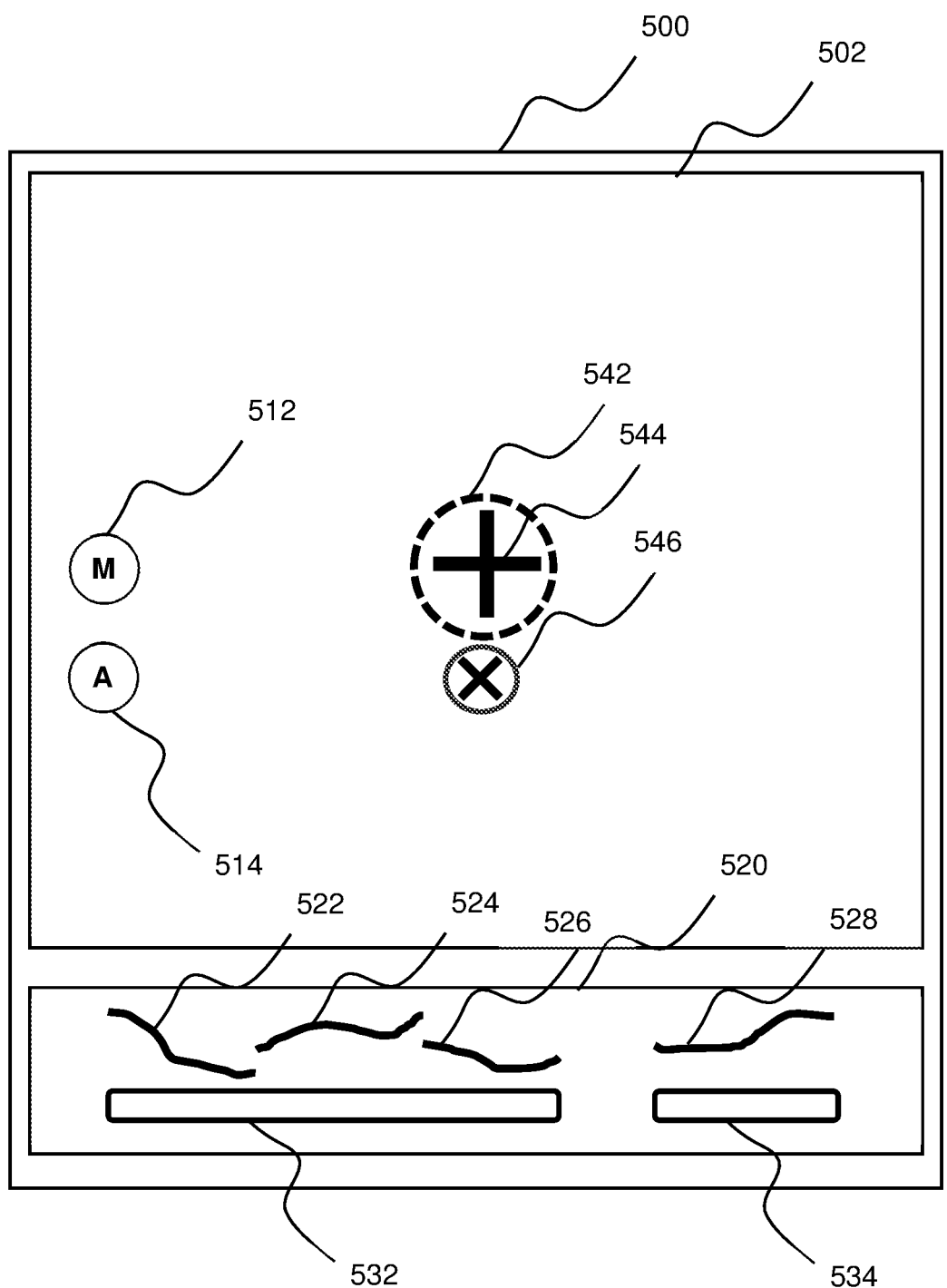
FIG. 5 illustrates an example graphical user interface.

FIG. 5 illustrates an example graphical user interface 500. The view of the graphical user interface 500 in FIG. 5 is provided merely as an example, and the arrangement and visual aspects of the graphical user interface may vary depending on the implementation. In some implementations, the graphical user interface may include additional features and/or alternative features. In some implementations, the graphical user interface may not include features shown in FIG. 5. Other graphical user interfaces are contemplated.

The graphical user interface 500 may include a view section 502, a manual mode element 512, an automatic mode element 514, a manual target element 542, a target element 544, and a delete element 546. The graphical user interface 500 may show viewing direction segments that have been set. For example, a viewing direction information section 520 of the graphical user interface 500 may show viewing direction segments 522, 524, 526, 528 that have been set based on user interaction with the graphical user interface 500. The viewing direction information section 520 may show bars 532, 534 for the temporal segments of the video in which the viewing direction has been set.

The user may interact with the delete element 546 to delete one or more viewing direction segments. For example, the user may have interacted with the graphical user interface 500 to set the viewing directions within the viewing direction segment 528. After the user has finished setting the viewing directions within the viewing direction segment 528, the user may interact with the delete element 546 to delete the viewing direction segment 528. The deletion of the viewing direction segment 528 may cause the play position of the video to go back in time to the moment at which the viewing direction segment 528 had started.

As another example, the user may have interacted with the graphical user interface to move the playback of the video to a moment within the viewing direction segment 524. The user may interact with the delete element 546 to delete the viewing direction segment 524. The deletion of the viewing direction segment 524 may cause the play position of the video to go back in time to the moment at which the viewing direction segment 524 had started.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
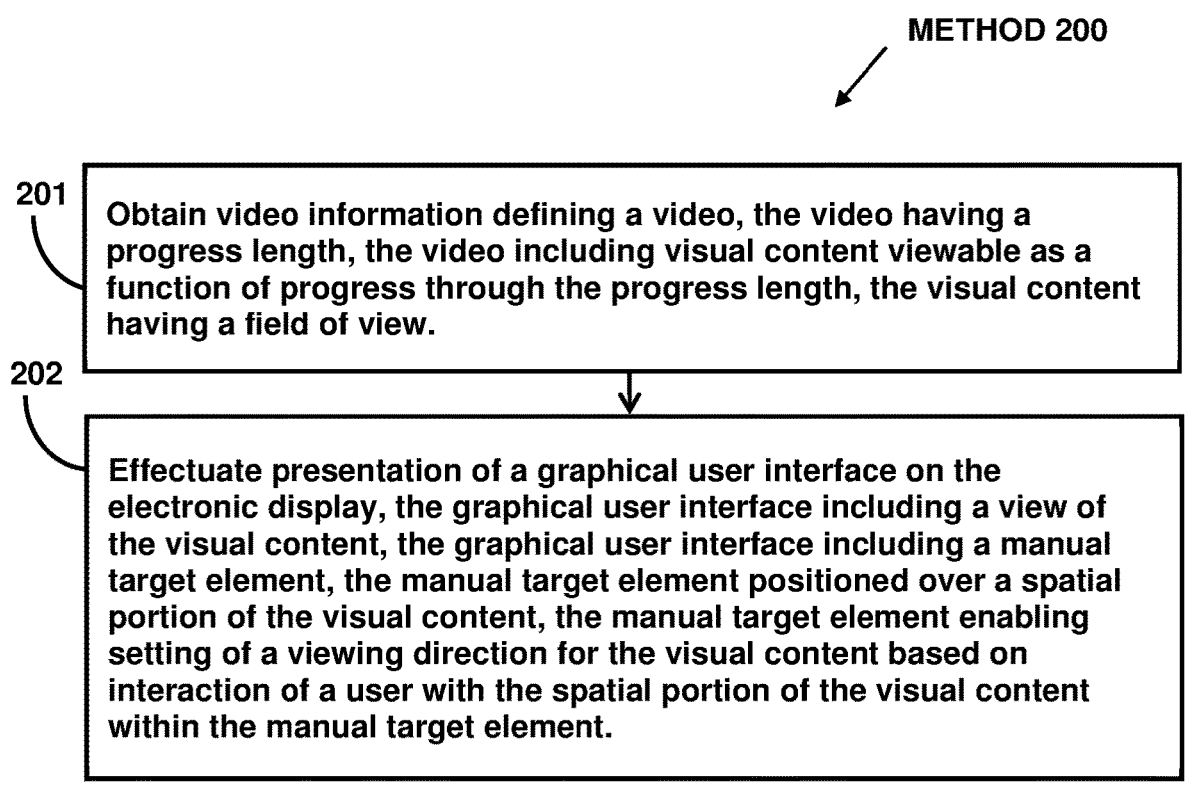
FIG. 2 illustrates an example method for setting viewing directions of videos.

FIG. 2 illustrates method 200 for setting viewing directions of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length. The visual content may have a field of view. In some implementations, operation 201 may be performed by a processor component the same as or similar to the video information component 102 (Shown in FIG. 1 and described herein).

At operation 202, presentation of a graphical user interface on the electronic display may be effectuated. The graphical user interface may include a view of the visual content. The graphical user interface may include a manual target element. The manual target element may be positioned over a spatial portion of the visual content. The manual target element may enable setting of a viewing direction for the visual content based on interaction of a user with the spatial portion of the visual content within the manual target element. In some implementations, operation 202 may be performed by a processor component the same as or similar to the graphical user interface component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for setting viewing directions of videos, the system comprising:
   an electronic display; and
   one or more physical processors configured by machine-readable instructions to:
   obtain video information defining a video, the video having a progress length, the video including visual content viewable as a function of progress through the progress length, the visual content having a field of view; and
   effectuate presentation of a graphical user interface on the electronic display, the graphical user interface including a view of the visual content, the graphical user interface including a manual target element, the manual target element positioned over a spatial portion of the visual content, the manual target element enabling setting of a viewing direction for the visual content based on interaction of a user with the spatial portion of the visual content within the manual target element;
   wherein:
   the interaction of the user with the spatial portion of the visual content within the manual target element causes playback of the visual content;
   the viewing direction for the visual content is set to be pointed at the spatial portion of the visual content with which the user interacts;
   the view of the visual content includes a punchout of the visual content within a viewing window, the viewing window positioned within the field of view of the visual content; and
   position of the viewing window within the field of view of the visual content is changed based on interaction of the user with other spatial portions of the visual content outside the manual target element.

2. The system of claim 1, wherein:
the interaction of the user with the spatial portion of the visual content within the manual target element initiates the setting of the viewing direction for the visual content as the function of progress through the progress length of the video;
the viewing direction set for the visual content as the function of progress through the progress length of the video changes based on changes in the spatial portion of the visual content with which the user interact;
the setting of the viewing direction for the visual content as the function of progress through the progress length of the video stops based on end of the interaction of the user with the spatial portion of the visual content, the viewing direction set for a temporal part of the progress length of the video; and
the viewing direction set for the temporal part of the progress length of the video forms a viewing direction segment.

3. A system for setting viewing directions of videos, the system comprising:
an electronic display; and
one or more physical processors configured by machine-readable instructions to:
obtain video information defining a video, the video having a progress length, the video including visual content viewable as a function of progress through the progress length, the visual content having a field of view; and
effectuate presentation of a graphical user interface on the electronic display, the graphical user interface including a view of the visual content, the graphical user interface including a manual target element, the manual target element positioned over a spatial portion of the visual content, the manual target element enabling setting of a viewing direction for the visual content based on interaction of a user with the spatial portion of the visual content within the manual target element.

4. The system of claim 3, wherein:
the view of the visual content includes a punchout of the visual content within a viewing window, the viewing window positioned within the field of view of the visual content; and
position of the viewing window within the field of view of the visual content is changed based on interaction of the user with other spatial portions of the visual content outside the manual target element.

5. The system of claim 3, wherein the viewing direction for the visual content is set to be pointed at the spatial portion of the visual content with which the user interacts.

6. The system of claim 5, wherein:
the interaction of the user with the spatial portion of the visual content within the manual target element initiates the setting of the viewing direction for the visual content as the function of progress through the progress length of the video; and
the viewing direction set for the visual content as the function of progress through the progress length of the video changes based on changes in the spatial portion of the visual content with which the user interacts.

7. The system of claim 6, wherein:
the setting of the viewing direction for the visual content as the function of progress through the progress length of the video stops based on end of the interaction of the user with the spatial portion of the visual content, the viewing direction set for a temporal part of the progress length of the video; and
the viewing direction set for the temporal part of the progress length of the video forms a viewing direction segment.

8. The system of claim 7, wherein the graphical user interface further includes a delete element, the delete element enabling deletion of the viewing direction segment based on interaction of the user with the delete element.

9. The system of claim 3, wherein the interaction of the user with the spatial portion of the visual content within the manual target element causes playback of the visual content.

10. The system of claim 3, wherein the graphical user interface further includes an automatic mode element, the automatic mode element enabling setting of the viewing direction for the visual content based on object tracking.

11. The system of claim 3, wherein the interaction of the user with the spatial portion of the visual content within the manual target element includes interaction of the user with the manual target element.

12. A method for setting viewing directions of videos, the method performed by a computing system including one or more processors and an electronic display, the method comprising:
obtaining, by the computing system, video information defining a video, the video having a progress length, the video including visual content viewable as a function of progress through the progress length, the visual content having a field of view; and
effectuating, by the computing system, presentation of a graphical user interface on the electronic display, the graphical user interface including a view of the visual content, the graphical user interface including a manual target element, the manual target element positioned over a spatial portion of the visual content, the manual target element enabling setting of a viewing direction for the visual content based on interaction of a user with the spatial portion of the visual content within the manual target element.

13. The method of claim 12, wherein:
the view of the visual content includes a punchout of the visual content within a viewing window, the viewing window positioned within the field of view of the visual content; and
position of the viewing window within the field of view of the visual content is changed based on interaction of the user with other spatial portions of the visual content outside the manual target element.

14. The method of claim 12, wherein the viewing direction for the visual content is set to be pointed at the spatial portion of the visual content with which the user interacts.

15. The method of claim 12, wherein the interaction of the user with the spatial portion of the visual content within the manual target element causes playback of the visual content.

16. The method of claim 15, wherein:
the interaction of the user with the spatial portion of the visual content within the manual target element initiates the setting of the viewing direction for the visual content as the function of progress through the progress length of the video; and
the viewing direction set for the visual content as the function of progress through the progress length of the video changes based on changes in the spatial portion of the visual content with which the user interacts.

17. The method of claim 16, wherein:
- the setting of the viewing direction for the visual content as the function of progress through the progress length of the video stops based on end of the interaction of the user with the spatial portion of the visual content, the viewing direction set for a temporal part of the progress length of the video; and
- the viewing direction set for the temporal part of the progress length of the video forms a viewing direction segment.

18. The method of claim 17, wherein the graphical user interface further includes a delete element, the delete element enabling deletion of the viewing direction segment based on interaction of the user with the delete element.

19. The method of claim 12, wherein the graphical user interface further includes an automatic mode element, the automatic mode element enabling setting of the viewing direction for the visual content based on object tracking.

20. The method of claim 12, wherein the interaction of the user with the spatial portion of the visual content within the manual target element includes interaction of the user with the manual target element.

\* \* \* \* \*